J. C. MILLIGAN.

Milk-Cans.

No. 5,850.

Reissued April 28, 1874.

Witnesses:

G. Mathys

Geo. C. Kemon

Inventor:

Jno. C. Milligan

Per Henry B.

Attorneys.

UNITED STATES PATENT OFFICE.

JOHN C. MILLIGAN, OF BROOKLYN, NEW YORK.

IMPROVEMENT IN MILK-CANS.

Specification forming part of Letters Patent No. 107,521, dated September 20, 1870; reissue No. 5,850, dated April 28, 1874; application filed February 10, 1874.

DIVISION A.

*To all whom it may concern:*

Be it known that I, JOHN C. MILLIGAN, of Brooklyn, in the county of Kings and State of New York, have invented a new and useful Improvement in Milk-Cans; and I do hereby declare that the following is a full, clear, and exact description of the same, reference being had to the accompanying drawing, forming a part of this specification.

This invention relates to improvements in the construction of milk-cans; and consists in the arrangements hereinafter described, having for their object to provide the strongest can with the least amount of metal, and the simplest construction.

Figure 3:
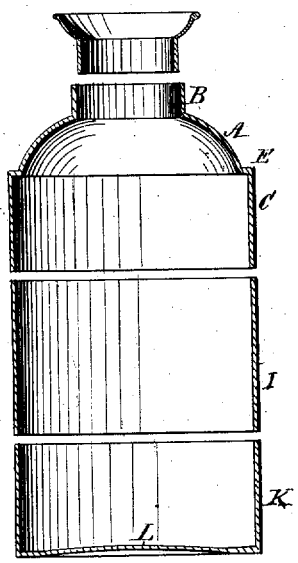
Figure 2:
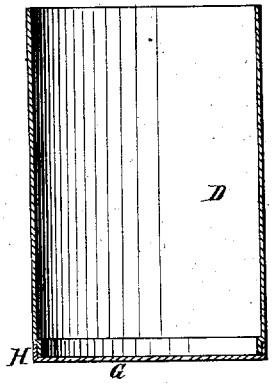
Figure 1:
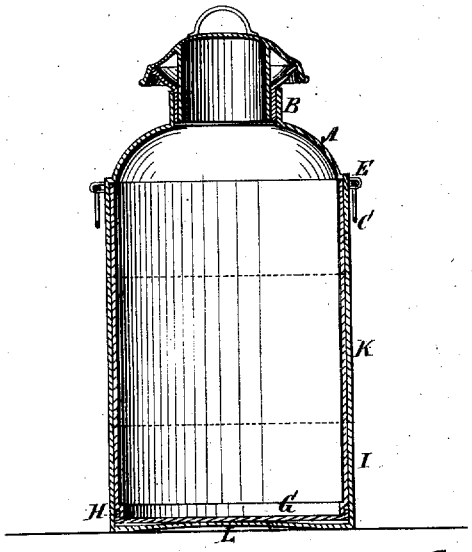

Figure 1 is a sectional elevation of my improved can. Fig. 2 is a section of an inner cylinder to which the breast and the strengthening-hoops are attached, and Fig. 3 is a sectional elevation of the breast and the hoops.

I propose to form the breast A, collar B, and a broad cylindrical hoop, C, together of one piece of sheet metal, as shown, and attach it to the upper end of the plain cylinder D, which is as long as the height of the can is to be between the breast and bottom, which is received into the hoop C against the base E of the breast, formed with a horizontal offset at the inside as wide as the thickness of the metal of which the cylinder D is composed, for the purpose of making the internal surface as smooth and uniform as possible; also, for providing a union of the surface of the top of the cylinder D with the breast when soldered, which, together with the union of the outer surface of D with the inner surface of C, is calculated to make the can very strong at the base of the breast, where great strength is highly desirable. The said collar, breast, and hoop C are to be formed in dies in the usual way of shaping such pieces. The cylinder D is provided with a bottom, G, by fitting the narrow vertical flange H in an annular recess at the lower end of D, as shown, and soldering them together, so that the outer surfaces of the two will be even, to admit of applying the hoops I K, the former of which may have a disk, L, for re-enforcing the bottom G of the cylinder D, said disk being either plane or raised toward the center up against the central portion of G.

The hoops may either be wide enough to cover the whole of the surface of D, or a part of it, as preferred.

Having thus described my invention, what I claim as new is—

The combination described, of the bottomed cylinder D, middle hoop K, bottomed hoop I L, and single piece, consisting of collar B, breast A E, and hoop C, to form a double-sided and double-bottomed can.

JOHN C. MILLIGAN.

Witnesses:
A. P. THAYER,
CHARLES H. NASH.